United States Patent Office 3,420,865
Patented Jan. 7, 1969

3,420,865
NOVEL CARBOCYCLIC FERROCENES
John T. Suh and Claude I. Judd, Mequon, Wis., assignors to Colgate-Palmolive Company, New York, N.Y., a corporation of Delaware
No Drawing. Filed May 12, 1966, Ser. No. 549,444
U.S. Cl. 260—439  5 Claims
Int. Cl. C07f 15/02

ABSTRACT OF THE DISCLOSURE

The compounds are carbocyclic ferrocenes in which the carbon bridge contains 3 to 5 carbon atoms. The compounds are useful as petroleum additives and hematinic agents. Representative of the compounds disclosed are α-hydroxy - α - phenyl-1,1'-trimethyleneferrocene, β-phenyl-β-hydroxy-1,1'-tetramethyleneferrocene, and 1,1'-[γ-(4-pyridyl)pentamethylene] ferrocene.

---

This application relates to novel ferrocene compounds. More particularly, it relates to novel carbocyclic ferrocenes, processes of preparing them, pharmaceutical compositions containing the compounds and therapeutic uses for such compositions. Ferrocene is the commonly accepted name for dicyclopentadienyliron or biscyclopentadienyliron.

The compounds of the present invention may be represented as follows:

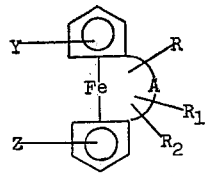

in which A is an alkylene of from 2 to 7 carbon atoms, R is hydrogen, a lower alkyl such as methyl, ethyl, isopropyl or butyl, an aralkyl such as benzyl, phenethyl and phenylisopropyl, or an aryl such as phenyl and nuclear substituted phenyls such as o-chlorophenyl, p-chlorophenyl, fluorophenyl, methoxyphenyl, benzyloxyphenyl and the like, or a heterocyclic such as 4-pyridyl, $R_1$ is hydrogen, hydroxy or a lower alkyl, $R_2$ is hydrogen, hydroxy, lower alkyl, aralkyl or aryl, provided, however, that either R or $R_2$ must be aryl except when $R_1$ is hydroxy, and Y and Z are preferably hydrogen, but may also be halogen such as chloro or bromo, trifluoromethyl or lower alkyl.

The novel compounds in which A is trimethylene, R is hydrogen, $R_1$ is hydrogen or hydroxy, and $R_2$ is aryl or lower alkyl may be represented by the following formula:

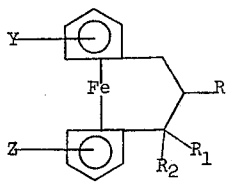

These compounds may be conveniently prepared by adding ferrocene portionwise to a mixture of N-methyl formanilide and phosphorus oxychloride. The mixture is treated with sodium acetate and stirred, and the resulting mixture extracted with ether, and the formylferrocene isolated from the ether extract. The formylferrocene is then treated with a dispersion of 50% sodium hydride and triethylphosphonoacetate in dried 1,2-dimethoxyethane with stirring for about 20 minutes at 20–25° C. The reaction mixture is diluted with water and extracted with ether. The ethyl β-(1-ferrocenyl)-acrylate, which is isolated from the ethereal extract, is then hydrogenated under standard hydrogenation conditions in the presence of an 85% platinum oxide catalyst, and the reaction mixture filtered to yield ethyl β-(1-ferrocenyl)propionate. The propionate is heated with ethanolic sodium hydroxide at 80° C. for about one hour, the mixture cooled, diluted and acidified with glacial acetic acid to precipitate β-ferrocenylpropionic acid. The acid is first treated with trifluoroacetic anhydride in anhydrous dichloromethane at 0° C., and then treated with 10% sodium hydroxide solution to yield α-keto-1,1'-trimethylene ferrocene. The resulting ketone is either treated with a Grignard reagent or an organolithium compound such as phenyl-lithium under standard reaction conditions to form the compounds in which A is trimethylene.

The above process may be represented as follows:

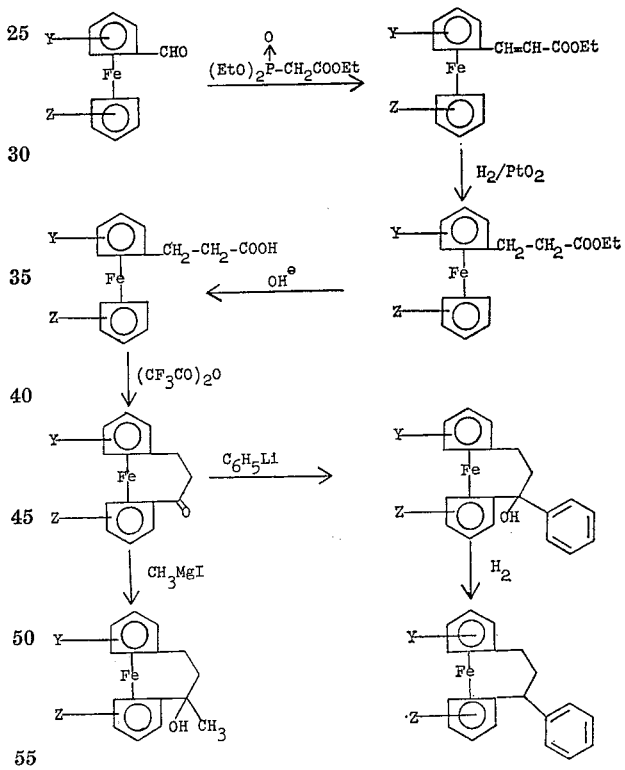

in which the symbols Y and Z are as previously defined and represent groups which do not interfere with or partake in the described reactions.

Representative of the compounds which may be prepared in the described manner are the following:

α-hydroxy-α-phenyl-1,1'-trimethyleneferrocene,
α-phenyl-1,1'-trimethyleneferrocene,
α-hydroxy-α-methyl-1,1'-trimethyleneferrocene, and
α-methyl-1,1'-trimethyleneferrocene.

The compounds in which A is trimethylene and R is an aryl such as 3,4-dimethoxyphenyl may be conveniently prepared from formylferrocene by treating it with a solution of sodium in ethanol to which has been added 3,4-dimethoxy-phenylacetonitrile and refluxing the resulting mixture for about two hours. Upon dilution with water 2-(3,4-dimethoxyphenyl)-3-(ferrocenyl)acrylonitrile precipitates, and upon treatment with hydrogen in the presence of a palladium on carbon catalyst under standard hydrogenation conditions forms 2-(3,4-dimethoxyphenyl)-3-(ferrocenyl)propionitrile. The nitrile is then treated with alcoholic potassium hydroxide under reflux conditions, diluted with water and acidified to precipitate the 2-(3,4-dimethoxyphenol)-3-(ferrocenyl)propionic acid. The resulting acid is treated with trifluoroacetic anhydride in dichloromethane to form α-keto-β-(3,4-dimethoxyphenyl)-1,1'-trimethylene ferrocene. This ketone is treated with either sodium borohydride or a Grignard reagent or a mixture of sodium hydroxide and hydrazine under standard reaction conditions to form the desired compounds.

The above processes may be represented as follows:

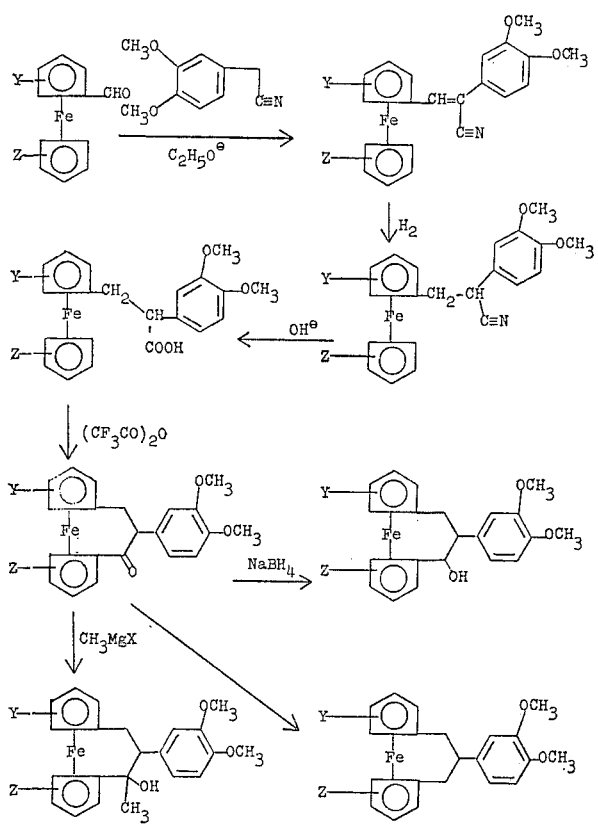

in which Y and Z are as previously defined and represent groups which do not interfere with or partake in the described reactions.

Representative of the compounds which may be prepared in the above described manner are the following:

[α-hydroxy-β-(3,4-dimethoxyphenyl)]-1,1' - trimethyleneferrocene
β-(3,4-dimethoxyphenyl)-1,1'-trimethyleneferrocene,
[α-hydroxy-α-methyl-β-(3,4-dimethoxyphenyl)]-1,1' - trimethyleneferrocene,
α-methyl-β-(3,4-dimethoxyphenyl)-1,1'-trimethyleneferrocene,
[α-hydroxy-β-(p-chlorophenyl)]-1,1' - trimethyleneferrocene,
β-(p-chlorophenyl)-1,1'-trimethyleneferrocene,
[α-hydroxy-α-methyl-β-(p-chlorophenyl)]-1,1'-trimethyleneferrocene,
α-methyl-β-(p-chlorophenyl)-1,-1,1'-trimethyleneferrocene, and α-phenyl-β(4-trifluoromethylphenyl)-1,1' - trimethyleneferrocene.

The compounds in which A is tetramethylene may be represented by the formula

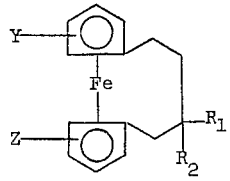

These compounds may be conveniently prepared by treating α-keto-1,1'-trimethyleneferrocene, which may be prepared as previously described, with a mixture of N-methyl - N' - nitro-N-nitrosoquanidine and potassium hydroxide in ether to form β-keto-1,1'-tetramethyleneferrocene. The resulting ketone may be then treated with an organolithium compound such as phenyl lithium to form β - phenyl-β-hydroxy-1,1'-tetramethyleneferrocene, which may in turn be hydrogenated to form β-phenyl-1,1'-tetramethyleneferrocene.

The above processes may be represented as follows:

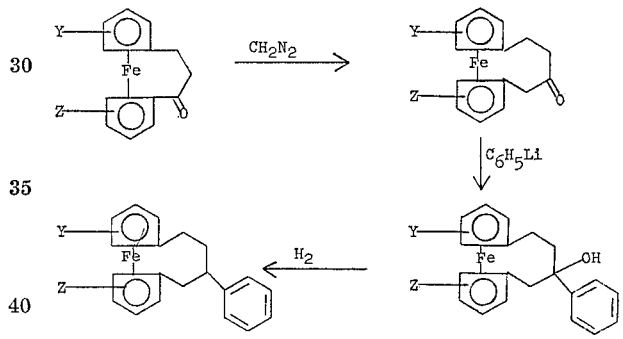

in which Y and Z are as previously described and represent groups which do not interfere with or partake in the reactions.

Representative of the compounds which may be prepared in the above described manner are the following:

β-phenyl-β-hydroxyl-1,1'-tetramethyleneferrocene,
β-phenyl-1,1'-tetramethyleneferrocene,
β-methyl-β-hydroxy-1,1'-tetramethyleneferrocene,
β-methyl-1,1'-tetramethyleneferrocene,
β-ethyl-β-hydroxyl-1,1'-tetramethyleneferrocene, and
β-ethyl-1,1'-tetramethyleneferrocene.

The compounds in which A is pentamethylene may be represented by the formula

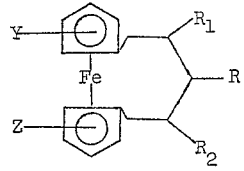

These compounds may be conveniently prepared by treating a 1,1'-diacylferrocene with an aromatic aldehyde in a suitable solvent such as dimethylformamide, in the presence of a catalytic amount of an alkali such as sodium hydroxide, to form the cyclic diones, which upon treatment with a lithium aluminum hydride-aluminum chloride mixture yield the γ-substituted α,α'-pentamethyleneferrocenes.

The above described process may be diagrammed as follows:

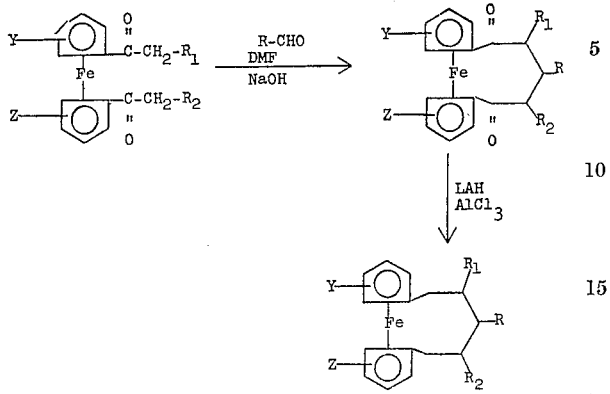

in which R is aryl, $R_1$ and $R_2$ are hydrogen or lower alkyl, and Y and Z are as previously described and represent groups which do not interfere wtih or partake in the reactions.

Representative of the compounds which may be prepared by this process are:

1,1'-(γ-phenylpentamethylene)-ferrocene,
1,1'-[γ-(p-chlorophenyl)pentamethylene]ferrocene,
1,1'-[γ-(4-pyridyl)pentamethylene]ferrocene,
1,1'-[γ-(p-hydroxyphenyl)pentamethylene]ferrocene, and
1,1'-[γ-(p-benzyloxyphenyl)pentamethylene]ferrocene.

While for purposes of illustration the preparation of relatively simple compounds has been described, it will be readily apparent to those skilled in the art that different and more complex substituents than those described for R, $R_1$, $R_2$, X and Y may be attached to molecules by conventional techniques.

It will also be apparent that the compounds in which A is an alkylene of 6 carbon atoms may be prepared by treating a β-keto-1,1'-pentamethyleneferrocene with N-methyl-N'-nitro-N-nitrosoquanidine and potassium hydroxide to form the β-keto-1,1'-hexamethyleneferrocene in a manner similar to that described for the preparation of the tetramethyleneferrocene compounds. The above process can be repeated employing β-keto-1,1'-hexamethyleneferrocene as a starting material to prepare the compounds in which A is an alkylene of 7 carbon atoms. The ketones thus prepared may then be treated as previously described to form the novel compounds of the present invention.

The carbocyclic ferrocenes of the present invention show promise as highly stable organo-iron sources for use in a variety of chemical procedures, e.g., polymerization reactions and the like. In addition, they can be used as petroleum additives such as anti-knock agents, or combined with pharmaceutical diluents and formed into suitable oral or parenteral dosage forms such as capsules, tablets or solutions, and employed as hematinics for the treatment of iron deficiencies in animals. Such pharmaceutical dosage forms will generally contain approximately 5 to 500 mg. of the novel compounds.

The following examples illustrate the preparation of the novel compounds:

EXAMPLE 1

Formylferrocene sodium bisulfite

To 195 g. (1.44 moles) of N-methylformanilide cooled in an ice-bath is added with stirring 138 g. (0.9 mole) of phosphorus oxychloride in 5 minutes and the mixture stirred for an additional 5 minutes. The ice-bath is removed and 105 g. (0.56 mole) of ferrocene added in portions during a period of 1½ hours so as to maintain the reaction temperature at 20–25° C. The viscous mixture is stirred at room temperature for 1 hour, gently heated (using water-bath) to 70° (requiring 20 minutes), and maintained at 70° C. for an additional 45 minutes. It is then cooled to 0° C. and a solution of 450 g. (5.5 moles) of sodium acetate in 1.5 liter of water added as rapidly as possible. The cooled mixture is allowed to warm slowly to room temperature and the stirring is continued overnight.

The solution is extracted once with 500 ml. of ether and twice with 300 ml. portions of ether. The combined ether solution is washed successively twice with 750 ml. portions of 1 N hydrochloric acid, once with 250 ml. of water, twice with 500 ml. portions of saturated sodium bicarbonate solution, and once with 500 ml. of water, all saturated with sodium chloride.

The ether solution is concentrated under diminished pressure at room temperature to 400 ml. and added to a cooled and rapidly stirred solution of 360 g. (3.46 moles) of sodium bisulfite in 900 ml. of water, and the mixture stirred for ½ hour. The resulting solid is collected, washed with 200 ml. of saturated sodium bisulfite solution, and dried in vacuo at 50° C. overnight to yield formylferrocene sodium bisulfite in the form of a gold crystalline solid.

EXAMPLE 2

Ethyl β-(1-ferrocenyl)acrylate

To a dispersion of 7.65 g. (0.16 mole) of 50% sodium hydride in 250 ml. of dried 1,2-dimethoxyethane is added 35.8 g. (0.16 mole) of triethylphosphonoacetate in 20 minutes at 20–25° and stirred for 30 minutes. A solution of 34.1 g. (0.16 mole) of formylferrocene in 75 ml. of 1,2-dimethoxyethane is added in 20 minutes at 20–28° and stirred for 30 minutes. The solution is then diluted with a large excess of water and extracted with ether. The extract is washed with brine, dried, and concentrated to yield a red solid which is recrystallized twice from aqueous ethanol to yield ethyl β-(1-ferrocenyl)acrylate in the form of orange platelets, M.P. 67.5–70°.

Analysis.—Calcd. for $C_{15}H_{16}FeO_2$: C, 63.40; H, 5.68; Fe, 19.66. Found: C, 63.70; H, 5.94; Fe, 19.11.

EXAMPLE 3

Ethyl β-(1-ferrocenyl)propionate

To a solution of 5.0 g. (0.018 mole) of ethyl β-(1-ferrocenyl)acrylate in 100 ml. of ethanol is added 200 mg. of 85% platinum oxide. The mixture is shaken with hydrogen (41.1 p.s.i.) until the theoretical amount (1.44 p.s.i.) has been taken up in 1 hour. The catalyst is removed by filtration and the filtrate concentrated to yield an oil which is crystalized from aqueous ethanol to yield ethyl β-(1-ferrocenyl)propionate in the form of a yellow powder, M.P. 29–30°.

Analysis.—Calcd. for $C_{15}H_{18}FeO_2$: C, 62.96; H, 6.34; Fe, 19.51. Found: C, 62.76; H, 6.48; Fe, 19.55.

EXAMPLE 4

β-Ferrocenylpropionic acid

To a solution of 75 ml. of 10% sodium hydroxide and 30 ml. of ethanol is added 2.0 g. (0.007 mole) of ethyl β-(1-ferrocenyl)propionate and heated at 80° for 1 hour. The solution is cooled, diluted with 200 ml. of water, and filtered. The filtrate is adjusted to pH 5 by the dropwise addition of glacial acetic acid and cooled. The precipitated solid is collected and dried to yield β-ferrocenylpropionic acid in the form of a bright yellow solid, M.P. 118–119°.

Analysis.—Calcd. for $C_{13}H_{14}FeO_2$: Fe, 21.63. Found: Fe, 21.48.

EXAMPLE 5

α-Keto-1,1'-trimethyleneferrocene

To a solution of 64.0 g. (0.33 mole) of trifluoroacetic anhydride in 60 ml. of anhydrous dichloromethane at 0° is added 42.6 g. (0.165 mole) of β-ferrocenepropionic acid dissolved in 500 ml. of anhydrous dichloromethane in 1½ hours. The reaction mixture is then stirred 2 hours at 0° and 2 hours at room temperature. It is then cooled in an ice bath while 610 ml. of 10% sodium hydroxide solution is added in 10 minutes. The stirring is continued for 1 hour after which the organic layer is separated and the aqueous layer extracted once with 200 ml. of chloroform.

The combined organic solution is washed once with 150 ml. of 10% sodium hydroxide solution, once with 150 ml. of brine, dried ($Na_2SO_4$), and concentrated in vacuo to yield a solid which is recrystallized from 300 ml. of benzene to yield α-keto-1,1'-trimethyleneferrocene in the form of a bright orange solid, M.P. 144–145°.

EXAMPLE 6

α-Hydroxy-α-phenyl-1,1'-trimethyleneferrocene

To a solution of 4.5 g. (0.0188 mole) of α-keto-1,1'-trimethyleneferrocene in 500 ml. of ether is added a solution of 2.12 g. (0.0253 mole, 12 ml. in benzene-ether) of phenyllithium in 20 ml. of ether in 20 minutes. It is stirred at room temperature 1.5 hours, and refluxed for 15 minutes after which the complex is decomposed by the addition of 5 ml. of saturated ammonium chloride solution. The solid is removed by filtration and the filtrate concentrated to yield a solid which is recrystallized from ethanol to yield α-hydroxy-α-phenyl-1,1'-trimethyleneferrocene in the form of a yellow powder, M.P. 144–146°.

*Analysis.*—Calcd. for $C_{19}H_{18}FeO$: C, 71.72; H, 5.70; Fe, 17.55. Found: C, 71.45; H, 5.62; Fe, 17.62.

EXAMPLE 7

α-Phenyl1,1'-trimethyleneferrocene

To a solution of 3.0 g. (0.0094 mole) of α-hydroxy-α-phenyl-1,1'-trimethyleneferrocene in 200 ml. of ethanol is added 0.7 g. of 10% palladium on carbon. The mixture is shaken with hydrogen (41.5 p.s.i.) until the theoretical amount (0.78 p.s.i.) has been taken up in 23 hours. The catalyst is removed by filtration and the filtrate concentrated to yield a solid which is recrystallized from ethanol to yield 1.93 g. in two crops. This is combined and recrystallized from ethanol to yield α-phenyl-1,1'-trimethyleneferrocene in the form of a yellow crystalline solid, M.P. 103–104°.

*Analysis.*—Calcd. for $C_{19}H_{18}Fe$: C, 75.52; H, 6.00; Fe, 18.48. Found: C, 75.28; H, 6.11; Fe, 18.42.

EXAMPLE 8

α-Hydroxy-α-methyl-1,1'-trimethyleneferrocene

To a Grignard reagent prepared from 0.61 g. (0.025 mole) of magnesium and 3.7 g. (0.026 mole) of methyl iodide in 150 ml. of ether is added 5 g. (0.0208 mole) of α-keto-1,1'-trimethyleneferrocene in 500 ml. of ether in 40 minutes. It is stirred at room temperature 3 hours after which the complex is decomposed by the addition of 12 ml. of saturated ammonium chloride solution. The solid is removed by filtration and the filtrate concentrated to yield a solid which is recrystallized from ethanol to yield 1.5 g. of starting material. The mother liquor is concentrated and the residue chromatographed through activated alumina (75 g., 2 x 33 cm.) using a total of 1.4 liters of varying proportions of benzene and n-hexane to isolate 0.85 g. of starting material, and 50 ml. of benzene and 400 ml. of ether to isolate 2.31 g. of a crude material which was combined and recrystallized from dilute ethanol to yield α-hydroxy-α-methyl-1,1'-trimethyleneferrocene in the form of a yellow powder, M.P. 112–114°.

*Analysis.*—Calcd. for $C_{14}H_{16}FeO$: C, 65.64; H, 6.30. Found: C, 65.74; H, 6.23.

EXAMPLE 9

2-(3,4-dimethoxyphenyl)-3-(ferrocenyl)acrylonitrile

To a solution of 4.24 g. (0.185 mole) of sodium in 230 ml. of ethanol is added 32.9 g. (0.186 mole) of 3,4-dimethoxy-phenylacetonitrile in one portion and heated to 45° and then stirred at room temperature for 15 minutes. A solution of 20 g. (0.093 mole) of 1-formylferrocene in 150 ml. of ethanol is daded in 15 minutes and the mixture stirred at room temperature for 0.5 hour, and refluxed for 2 hours. Dilution with water and cooling precipitates an oil which crystallizes upon scratching. The solids are collected and recrystallized from ethanol to yield 2-(3,4-dimethoxyphenyl)-3-(ferrocenyl) acrylonitrile in the form of a dark red crystalline solid, M.P. 114–117°.

*Analysis.*—Calcd. for $C_{21}H_{19}FeNO_2$: C, 67.53; H, 5.13; Fe, 14.97; N, 3.76. Found: C, 67.15; H, 5.39; Fe, 14.87; N, 3.57.

EXAMPLE 10

2-(3,4-dimethoxyphenyl)-3-(ferrocenyl)propionitrile

To a solution of 4 g. (0.0107 mole) of 2-(3,4-dimethoxyphenyl)-3-(ferrocenyl)acrylonitrile in 35 ml. of dimethylformamide is added 0.5 g. of 10% palladium on carbon. The mixture is shaken with hydrogen (39.2 p.s.i.) until the theoretical amount (0.88 p.s.i.) has been taken up in 1 hour. The catalyst is removed by filtration and the filtrate diluted with 500 ml. of water. The precipitated solid is collected, washed with water and recrystallized from ethanol to yield 2-(3,4-dimethoxyphenyl)-3-(ferrocenyl)propionitrile in the form of a yellow crystalline solid, M.P. 127–129°.

*Analysis.*—Calcd. for $C_{21}H_{21}FeNO_2$: C, 67.22; H, 5.64; Fe, 14.88; N, 3.73. Found: C, 67.44; H, 5.57; Fe, 14.88; N, 3.87.

EXAMPLE 11

2-(3,4-dimethoxyphenyl)-3-(ferrocenyl)propionic acid

To a solution of 13.7 g. (0.24 mole) of potassium hydroxide in 435 ml. of water and 280 ml. of isopropanol is added 13.05 g. (0.035 mole) of 2-(3,4-dimethoxyphenyl)-3-(ferrocenyl)-propionitrile. The reaction mixture is refluxed for 70 hours. The reaction mixture is diluted with 2 liters of water and extracted once with 200 ml. of benzene. The aqueous solution is filtered and the filtrate acidified slowly with 50 ml. of glacial acetic acid at low temperature. The precipitate is collected, dissolved in 400 ml. of ether and washed twice with 100 ml. portions of brine. The organic solution is dried and concentrated to yield a viscous liquid which is allowed to reflux with 100 ml. of n-hexane for 0.5 hour, cooled, and the solvent decanted. The procedure is repeated to yield 2-(3,4-dimethoxyphenyl)-3-ferrocenyl)propionic acid in the form of a yellow powder, M.P. 107–110°.

*Analysis.*—Calcd. for $C_{21}H_{22}FeO_4$: C, 63.98; H, 5.62; Fe, 14.17. Found: C, 63.87; H, 5.68; Fe, 14.10.

EXAMPLE 12

α-Keto-β-(3,4-dimethoxyphenyl)-1,1'-trimethyleneferrocene

To a solution of 105 g. (0.5 mole) of trifluoroacetic-anhydride in 500 ml. of dry dichloromethane cooled to 5° is added 53.3 g. (0.135 mole) of 2-(3,4-dimethoxyphenyl)-3-(ferrocenyl)propionic acid in 500 ml. of dry dichloromethane in 20 minutes. The reaction mixture is stirred at 5° for 19 hours. A solution of 1.2 liters of 5% sodium hydroxide is added and stirred for 1.5 hours. The organic solution is separated, washed with 400 ml. of brine, dried, and concentrated to yield a viscous oil which is refluxed in 400 ml. of methanol for 1 hour, cooled, collected, and dried to yield α-keto-β-(3,4-dimethoxyphenyl)-1,1'-trimethyleneferrocene in the form of an orange, light-textured solid, M.P. 158–162°.

*Analysis.*—Calcd. for $C_{21}H_{20}FeO_3$: C, 67.03; H, 5.36; Fe, 14.85. Found: C, 67.00; H, 5.62; Fe, 15.04.

EXAMPLE 13

[α-Hydroxy-β-(3,4-dimethoxyphenyl)]-1,1'-trimethyleneferrocene

To a mixture of 0.4 g. (0.011 mole) of sodium borohydride in 50 ml. of isopropanol is added 1.3 g. (0.0035 mole) of an α-keto-β-(3,4-dimethoxyphenyl)-1,1'-trimethyleneferrocene and refluxed for 4.5 hours. The solvent is removed in vacuo and 200 ml. of ether and 50 ml. of brine added and stirred overnight. The organic layer is separated, washed with 100 ml. of brine, dried, and concentrated to yield a solid which is recrystalized from ethanol to yield [α-hydroxy-β-(3,4-dimethoxyphenyl)]-1,1'-trimethyleneferocene in the form of a light yellow, crystalline solid, M.P. 190–191.5° C.

Analysis.—Calcd. for $C_{21}H_{22}FeO_3$: C, 66.68; H, 5.86. Found: C, 66.94; H, 6.00.

EXAMPLE 14

β-(3,4-dimethoxyphenyl)-1,1'-trimethyleneferrocene

A mixture of 2.2 g. (0.006 mole) of α-keto-β-(3,4-dimethoxyphenyl)-1,1'-trimethyleneferrocene, 3.8 g. (0.1 mole) sodium hydroxide, and 0.57 g. (0.02 mole) of 97% anhydrous hydrazine in 35 ml. of diethylene glycol is refluxed for 5 hours. It is then diluted with 500 ml. of brine and extracted three times with 150-ml. portions of benzene. The combined extracts are filtered, washed with 200 ml. of saturated sodium bicarbonate, dried, and concentrated to yield a dark semi-solid which is chromatographed through aluminum oxide (45 g., 2 x 20 cm.) using 450 ml. of 75% benzene/n-hexane as an eluent to yield β-(3,4-dimethoxyphenyl)-1,1'-trimethylene-ferrocene in the form of a yellow powder, M.P. 167–168°.

Analysis.—Calcd. for $C_{21}H_{22}FeO_2$: C, 69.92; H, 6.12. Found: C, 69.80; H, 6.27.

EXAMPLE 15

[α-hydroxy-α-methyl-β-(3,4-dimethoxyphenyl)]-1,1'-trimethyleneferrocene

To a Grignard reagent prepared from 0.45 g. (0.018 mole) of magnesium and 5.3 g. (0.037 mole) of methyl iodide in 30 ml. of ether is added a solution of 3.5 g. (0.01 mole) of [α-keto-β-(3,4-dimethoxyphenyl)]-1,1'-trimethyleneferrocene in 75 ml. of benzene in 15 minutes and heated at 55–60° for 2 hours. The complex is decomposed by the addition of 15 ml. of saturated ammonium chloride. The solid is removed by filtration and washed with warm benzene. The filtrate is dried and concentrated to yield a solid which is recrystallized three times from benzene to yield [α-hydroxy-α-methyl-β-(3,4-dimethoxyphenyl)]-1,1'-trimethyleneferrocene in the form of a yellow powder, M.P. 193.5–195°.

Analysis.—Calcd. for $C_{22}H_{24}FeO_3$: C, 67.37; H, 6.16; Fe, 14.24. Found: C, 67.96; H, 6.69; Fe, 14.00.

EXAMPLE 16

β-keto-1,1'-tetramethyleneferrocene

Potassium hydroxide (15 ml., 40%) and 50 ml. ether are cooled to 0° C. and 3.7 g. (0.025 mole) of N-methyl-N'-nitro-N-nitrosoguanidine are slowly added and the ethereal layer is added to a cooled solution of 5.5 g. of ketone of Example 5 in 750 ml. methanol.

The solution is allowed to stand in the dark at 4° C. for 5 days after which 50 ml. glacial acetic acid is added to destroy any residual diazomethane. Removal of solvent gives a brown pasty mass which chromatographed on silica gel to yield β-keto-1,1'-tetramethyleneferrocene, M.P. 109.5–111°.

Analysis.—Calcd. for $C_{14}H_{14}FeO$: Fe, 21.97. Found: Fe, 21.86.

EXAMPLE 17

β-phenyl-β-hydroxy-1,1'-tetramethyleneferrocene

To 1.79 g. (0.021 mole) of phenyllithium solution (19.9%) dissolved in 10 ml. dry ether is added dropwise 2.53 g. (0.010 mole) of β-keto-1,1'-tetramethyleneferrocene in 20 ml. of dry ether. After the addition (20 minutes), the mixture is stirred at room temperature for 1 hour and briefly at reflux. A saturated solution (50 ml.) of ammonium chloride is added to decompose the complex and the product is extracted into chloroform, washed with water, and dried over sodium sulfate. Removal of the solvent afforded an oil which is crystallized from benzene n-hexane to give β-phenyl-β-hydroxy-1,1'-tetramethyleneferrocene in the form of brown-gold crystals, M.P. 117–118.5°.

Analysis.—Calcd. for $C_{20}H_{20}FeO$: C, 72.31; H, 6.07; Fe, 16.81. Found: C, 72.94; H, 6.21; Fe, 16.77.

EXAMPLE 18

β-phenyl-1,1'-tetramethyleneferrocene

In 250 ml. of ethanol is placed 2.72 g. (0.082 mole) of β-phenyl-β-hydroxy-1,1'-tetramethyleneferrocene and 1.0 g. of 10% palladium on charcoal. The mixture is shaken with hydrogen at 40 p.s.i. for 21 hours after which the mixture is filtered and the alcohol is evaporated to give a yellow solid which is crystallized from methanol to give β-phenyl-1,1'-tetramethyleneferrocene in the form of golden needles, M.P. 111–113°.

Analysis.—Calcd. for $C_{20}H_{20}Fe$: C, 75.96; H, 6.37; Fe 17.66. Found: C, 76.15; H, 6.39; Fe, 17.71.

EXAMPLE 19

1,1'-(α,α'-diketo-γ-phenyl-pentamethylene)-ferrocene

To a solution of 0.9 g. (0.022 mole) of sodium hydroxide in 20 ml. of water is added 60 ml. of dimethylformamide and cooled to 0°. 1,1-diacetylferrocene (2.7 g., 0.01 mole) is added in one portion and stirred until all is dissolved. A solution of 1.17 g. (0.011 mole) of benzaldehyde in 15 ml. of dimethylformamide is added in 2 minutes and stirred 1 hour while allowing to warm slowly to room temperature. The mixture is then cooled in an ice bath and the precipitated solids collected, washed with water, dried and recrystallized from 650 ml. of acetonitrile to yield 1,1'-(α,α'-diketo-γ-phenyl-pentamethylene)-ferrocene in the form of orange light textured needles, M.P. 294°.

Analysis.—Calcd. for $C_{21}H_{18}FeO_2$: C, 70.41; H, 5.06; Fe, 15.59. Found: C, 70.20; H, 4.96; Fe, 15.43.

EXAMPLE 20

1,1'-[α,α'-diketo-γ-(p-chlorophenyl)-pentamethylene]-ferrocene

A solution of 1 g. of sodium hydroxide in 10 ml. of water is added to 25 ml. of dimethylformamide (DMF). To the above solution is added a solution of 1,1'-diacetylferrocene (2.7 g., 0.01 mole) in 30 ml. of DMF and 1.4 g. (0.01 mole) of p-chlorobenzaldehyde and the resulting mixture is stirred at 0°–10° C. for 2 hours under nitrogen atmosphere. The reaction mixture is filtered and the residue washed with water to give 1,1'-[α,α'-diketo-γ-(p-chlorophenyl)-pentamethylene]-ferrocene, M.P. 285°. One recrystallization from acetonitrile provided yellow needles, M.P. 290°.

Analysis.—Calcd. for $C_{21}H_{17}ClFeO_2$: C, 64.24; H, 4.37; Cl, 9.03. Found: C, 64.10; H, 4.32; Cl, 9.36.

EXAMPLE 21

1,1'-[α,α'-diketo-γ-(4-pyridyl)pentamethylene]-ferrocene

To a solution of 8 g. of sodium hydroxide in 20 ml. of water is added 250 ml. of DMF. To the solution is added with stirring and cooling (0°–10° C.) 750 ml. of DMF containing 20 g. (0.074 mole) of 1,1'-diacetylferrocene and 10.7 g. (0.1 mole) of 4-pyridinecarboxaldehyde. The reaction mixture is stirred at 0°–10° C. for 10 hours.

The reaction mixture is filtered, and the residue washed with 1 liter of water to give 8.5 g. (32%) of yellow plates. After recrystallization from acetonitrile and benzene-ethanol, there was obtained 1,1′-[α,α′-diketo-γ-(4-pyridyl)pentamethylene]-ferrocene in the form of yellow plates, M.P. 275–279°.

*Analysis.*—Calcd. for $C_{20}H_{17}FeNO_2$: C, 66.87; H, 4.76; N, 3.90. Found: C, 66.63; H, 4.95; N, 3.60.

EXAMPLE 22

1,1′-[α,α′-diketo-γ-(p-N,N-diethylaminoethoxyphenyl)-pentamethylene]-ferrocene

A solution of 0.9 g. (0.022 mole) of sodium hydroxide in 10 ml. of water is added dropwise to a cooled solution of 2.7 g. (0.01 mole) of 1,1′-diacetylferrocene in 50 ml. of dimethylformamide. 4-(β-N,N-diethylaminoethoxy)-benzaldehyde (2.36 g., 0.012 mole) is added dropwise after which the solution is stirred for 1 hour while allowing to warm to room temperature. It is then cooled to 10° and the solids collected, washed three times with warm water, dried and recrystallized twice from chloroform/n-hexane to yield 1,1′-[α,α-′diketo-γ-(p-N,N-diethylaminoethoxyphenyl)-pentamethylene]-ferrocene, M.P. 240°.

*Analysis.*—Calcd. for $C_{27}H_{31}FeNO_3$: Fe, 11.80. Found: Fe, 11.73.

EXAMPLE 23

1,1′[α,α′-diketo-γ-(p-benzyloxyphenyl)pentamethylene]ferrocene

To a solution of 10 g. of sodium hydroxide in 15 ml. of water and 250 ml. of DMF is added in portion with stirring 27 g. (0.1 mole) of 1,1′-diacetylferrocene and 22 g. (0.1 mole) of p-benzyloxybenzaldehyde in 500 ml. of DMF.

The reaction mixture is allowed to react at 10–15° C. for 2 hours. The solid product is filtered, washed with 1 liter of water, and dried to give the crude dione which is recrystallized from 1,4-dioxane to yield 1,1′-[α,α-diketo-γ-(p-benzyloxyphenyl)pentamethylene]ferrocene in the form of orange needles, M.P. 192–195°.

*Analysis.*—Calcd. for $C_{28}H_{24}FeO_3$: C, 72.40; H, 5.20; Fe, 12.03. Found: C, 72.17; H, 5.05; Fe, 11.78.

EXAMPLE 24

1,1′-[α,α′-diketo-γ-(o-chlorophenyl)-pentamethylene]ferrocene

To a solution of 2.0 g. of sodium hydroxide in 10 ml. of water is added 200 ml. of DMF containing 5.4 g. (0.02 mole) of 1,1′-diacetylferrocene and 2.8 g. (0.02 mole) of o-chlorobenzaldehyde and the resulting reaction mixture is stirred at 0–10° C. for 90 minutes.

The reaction mixture is filtered and the yellow solid residue is washed with water and dilute methanol. The residue is recrystallized from 500 ml. of acetonitrile to give 1,1′-α,α′-diketo-γ-(p-benzyloxyphenyl)pentamethylene]ferrocene in the form of golden plates, M.P. 265°.

*Analysis.*—Calcd. for $C_{21}H_{17}ClFeO_2$: Fe, 14.23. Found: Fe, 14.42.

EXAMPLE 25

1,1′-[γ-(p-benzyloxyphenyl)pentamethylene]ferrocene

To a dispersion of 8.0 g. (0.0172 mole) of 1,1′-[α,α′-diketo-γ-(p-benzyloxyphenyl) - pentamethylene]ferrocene and 2.4 g. (0.068 mole) of LAH and 800 ml. of ether is added 18.1 g. (0.13% mole) of aluminum chloride in 10 minutes with ice bath cooling. The reaction mixture is then stirred at room temperature overnight. Wet ether (200 ml.) is added slowly after which 300 ml. of brine is added dropwise. The organic layer is separated and washed successively with 100 ml. of brine, twice with 200 ml. portions of 10% sulfuric acid solution and once again with 100 ml. of brine. It is dried and concentrated to yield a solid which was recrystallized from 250 ml. of isopropanol to yield 1,1′-[γ-(p - benzyloxyphenyl)pentamethylene]ferrocene in the form of yellow gold crystals, M.P. 120–123°.

*Analysis.*—Calcd. for $C_{28}H_{28}FeO$: Fe, 12.80. Found: Fe, 12.51.

EXAMPLE 26

1,1′-(γ-phenylpentamethylene)-ferrocene

Method A: Clemmenson reduction.—A mixture of 20.0 g. (0.31 mole) of granulated zinc, 2.0 g. (0.007 mole) of mercuric chloride, 20 ml. of water, and 1 ml. of concentrated hydrochloric acid is stirred for 5 minutes. The aqueous solution is decanted off and 40 ml. of ethanol, 55 ml. of concentrated hydrochloric acid and 5.0 g. (0.014 mole) of finely ground 1,1′-(α,α′-diketo-γ-phenylpentamethylene)-ferrocene are added and refluxed for 4¼ hours with rapid stirring. It is then cooled to room temperature, 200 ml. of chloroform added and stirred 5 minutes. The organic solution is separated, washed with 100 ml. of brine and 100 ml. of saturated sodium bicarbonate solution. It is then dried and concentrated to yield a semi-solid which is taken up in 100 ml. of refluxing benzene and filtered to remove 0.9 g. of starting ketone. The filtrate is treated with darco and concentrated. The residue is dissolved in 150 ml. of refluxing n-hexane, cooled and filtered. The filtrate is again treated with darco and concentrated to yield an oil which is chromatographed through aluminum oxide (100 g., 3 x 12 cm.) using 600 ml. of varying proportions of benzene and petroleum ether to yield a solid which is recrystallized from petroleum ether and cooled in Dry Ice/acetone to yield a yellow powder, M.P. 104–106°.

*Analysis.*—Calcd. for $C_{21}H_{22}Fe$: C, 76.37; H, 6.72. Found: C, 76.13; H, 6.72.

Method B: Reduction with LAH and aluminum chloride—To a cooled mixture of 13.1 g. (0.098 mole) of aluminum chloride in 300 ml. of ether is added in portions 1.86 g. (0.049 mole) of lithium aluminum hydride and stirred for 10 minutes. At room temperature 5.0 g. (0.014 mole) of finely ground 1,1′-(α,α′-diketo-γ-phenylpentamethylene)-ferrocene is added in 5 minutes, and the mixture refluxed gently for 1.5 hours. The complex is then decomposed by first the dropwise addition of 200 ml. of wet ether, followed by a solution of 5 ml. of ethylacetate in 25 ml. of ether after which 25 ml. of ethylacetate is added. The solids are removed by filtration, the filtrate dried and concentrated to yield a solid which was recrystallized twice from n-hexane to yield an orange powder in two crops, M.P. 109–111°.

*Analysis.*—Calcd. for $C_{21}H_{22}Fe$: Fe, 16.91. Found: Fe, 16.67.

EXAMPLE 27

1,1′-[γ-(p-clorophenyl)pentamethylene]ferrocene

To a dispersion of 5.0 g. (0.0126 mole) of 1,1′-[α,α′-diketo-γ-(p-chlorophenyl)pentamethylene]ferrocene and 1.8 g. (0.05 mole) of LAH in 600 ml. of ether is added 13.3 g. (0.01 mole) of aluminum chloride in 15 minutes with ice bath cooling. The reaction mixture is then stirred at room temperature for 16 hours. Wet ether (200 ml.) is added slowly after which 200 ml. of brine is added dropwise. The organic layer is separated and washed successively with 100 ml. of brine, 200 ml. of 10% sulfuric acid solution and 100 ml. of brine. It is dried and concentrated to yield a solid which was chromatographed through aluminum oxide (150 g., 3 x 25 cm.) using 300 ml. of 25% benzene in n-hexane as an eluent to yield a solid which is recrystallized from n-hexane to yield 1,1′-[γ-(p-chlorophenyl)pentamethylene]ferrocene in the form of a yellow gold crystalline solid, M.P. 110–112°.

*Analysis.*—Calcd. for $C_{21}H_{21}FeCl$: Fe, 15.33. Found: Fe, 15.28.

EXAMPLE 28

1,1′-[γ-(4-pyridyl)pentamethylene]ferrocene

To a dispersion of 2.8 g. (0.074 mole) of LAH and 5.3 g. (0.014 mole) of 1,1′-[α,α′-diketo-γ-(4-pyridyl) pentamethylene]ferrocene in 500 ml. of ether is added 11.3 g. (0.085 mole) of aluminum chloride in 5 minutes, with ice bath cooling. The reaction is stirred at room temperature for 1 hour and refluxed 16 hours. It is cooled and 200 ml. of wet ether added slowly after which 500 ml. of brine is added dropwise. The organic layer is separated, washed with 100 ml. of water, dried and concentrated to yield a solid which is recrystallized twice from aqueous ethanol to yield 1,1'-[γ-(4-pyridyl)pentamethylene]ferrocene in the form of red, brown platelets, M.P. 128–130°.

*Analysis.*—Calcd. for $C_{20}H_{21}FeN$: C, 72.50; H, 6.39; N, 4.23. Found: C, 72.71; H, 6.57; N, 4.44.

EXAMPLE 29

1,1'-[γ-(p-hydroxyphenyl)pentamethylene]ferrocene

To a dispersion of 3.65 g. (0.0084 mole) of finely ground 1,1'-[γ - (p - benzyloxyphenyl)pentamethylene]ferrocene in 150 ml. of ethanol is added 0.6 g. of 10% palladium on carbon. The mixture is shaken with hydrogen (34.9 p.s.i.) until the theoretical amount (0.7 p.s.i.) has been taken up in 175 hours The catalyst is removed by filtration and the filtrate concentrated to yield a solid which is recrystallized from 40 ml of methanol to yield 1,1'-[γ - (p-hydroxyphenyl)pentamethylene]ferrocene in the form of an orange solid, M.P. 160–161°.

EXAMPLE 30

1,1'-[γ-(p-hydroxyphenyl)pentamethylene]ferrocene

To a dispersion of 1.52 g. (0.042 mole) of LAH and 5.0 g. (0.011 mole) of 1,1'-[α,α'-diketo-γ-(p-N,N-diethylaminoethoxyphenyl) - pentamethylene]ferrocene in 500 ml. of ether is added 11.3 g. (0.085 mole) of aluminum chloride in 15 minutes with ice bath cooling. The reaction is stirred at room temperature 1 hour and refluxed 17.5 hours. It is cooled and 200 ml. of wet ether added slowly after which 450 ml. of water is added dropwise. The organic layer is separated, washed with 100 ml. water, dried and concentrated to yield an oil which is crystallized twice from aqueous ethanol and once from ethanol to yield 1,1' - [γ-(p-hydroxyphenyl)pentamethylene]ferrocene in the form of an orange solid. M.P. 159–160.5°.

*Analysis.*—Calcd. for $C_{21}H_{22}FeO$: Fe, 16.13. Found: Fe, 15.84.

We claim:
1. A compound having the formula

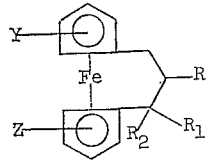

wherein Y and Z are hydrogen, halogen, trifluoromethyl or lower alkyl, R is dimethoxyphenyl, $R_1$ is hydrogen or OH, and $R_2$ is hydrogen or lower alkyl.

2. A compound having the formula

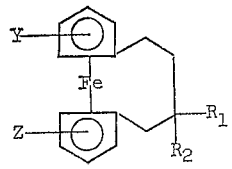

in which Y and Z are hydrogen, halogen, trifluoromethyl or lower alkyl, $R_1$ is hydrogen or hydroxy, and $R_2$ is phenyl or nuclear substituted phenyl.

3. A compound having the formula

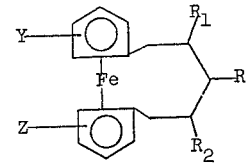

in which Y and Z are hydrogen, halogen, trifluoromethyl or lower alkyl, and R is phenyl, 4-pyridyl or nuclear substituted phenyl, $R_1$ and $R_2$ are hydrogen or lower alkyl.

4. The method of preparing a compound of claim 2 which comprises treating an α-keto-1,1'-trimethyleneferrocene with N-methyl-N'-nitro-N-nitrosoguanidine in alkaline ether to form a β-keto-1,1'-tetramethyleneferrocene, then treating said compound with phenyllithium to form a compound of the formula

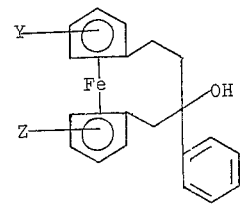

wherein Y and Z are groups which do not partake in the reaction.

5. The method of preparing a compound of claim 3 which comprises treating a 1,1'-diacyl ferrocene with an aromatic aldehyde in the presence of a catalytic amount of an alkali to form a cyclic dione which upon treatment with a lithium aluminum hydride-aluminum chloride mixture yields a compound of the formula

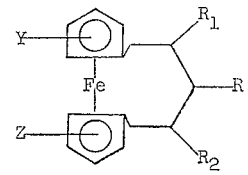

in which R is phenyl, 4-pyridyl or nuclear substituted phenyl, $R_1$ and $R_2$ are hydrogen or lower alkyl, and Y and Z are groups which do not partake in the reaction.

References Cited

UNITED STATES PATENTS 3,063,974  11/1962  Pruett et al. _____ 260—80

OTHER REFERENCES

Rinehart et al.: J. Am. Chem. Soc., 85 (1963), p. 970.
Pauson: J. Am. Chem. Soc., 76 (1954), pp. 2187–89.

HELEN M. McCARTHY, *Primary Examiner.*

A. P. DEMERS, *Assistant Examiner.*